United States Patent
Liu (10) Patent No.: US 12,223,312 B2
(45) Date of Patent: Feb. 11, 2025

(54) STORAGE CONTROLLER SYSTEM UPDATING METHOD AND SYSTEM, COMPUTER DEVICE, AND STORAGE MEDIUM

(71) Applicant: Suzhou MetaBrain Intelligent Technology Co., Ltd., Suzhou (CN)

(72) Inventor: Yuan Liu, Suzhou (CN)

(73) Assignee: SUZHOU METABRAIN INTELLIGENT TECHNOLOGY CO., LTD., Suzhou (CN)

(*) Notice: Subject to any disclaimer, the term of this patent is extended or adjusted under 35 U.S.C. 154(b) by 0 days.

(21) Appl. No.: 18/718,690

(22) PCT Filed: Mar. 9, 2023

(86) PCT No.: PCT/CN2023/080531
§ 371 (c)(1),
(2) Date: Jun. 11, 2024

(87) PCT Pub. No.: WO2023/246180
PCT Pub. Date: Dec. 28, 2023

(65) Prior Publication Data
US 2024/0419432 A1     Dec. 19, 2024

(30) Foreign Application Priority Data
Jun. 23, 2022   (CN) .......................... 202210717906.X (51) Int. Cl.
G06F 9/445     (2018.01)
G06F 8/65      (2018.01)
(52) U.S. Cl.
CPC ..................................... *G06F 8/65* (2013.01)

(58) Field of Classification Search
CPC ........ G06F 8/65; G06F 3/0629; G06F 16/951; G06F 3/0622; G06F 3/0625; G06F 3/0673
(Continued)

(56) References Cited

U.S. PATENT DOCUMENTS 6,260,120 B1 * 7/2001 Blumenau ............... G06F 21/80
                                                                711/149
9,971,526 B1    5/2018 Wei et al.
(Continued)

FOREIGN PATENT DOCUMENTS

CN     110011855 A    7/2019
CN     110752941 A    2/2020
(Continued)

OTHER PUBLICATIONS

International Search Report of corresponding PCT application (PCT/CN2023/080531) May 23, 2023 including English translation (5 pages).

(Continued)

*Primary Examiner* — Chuck O Kendall
(74) *Attorney, Agent, or Firm* — Crowell & Moring LLP (57) ABSTRACT

A storage controller system updating method includes: performing a system updating operation on a storage controller, and obtaining a real-time speed value and a real-time operation volume value that are generated when the system updating operation is performed on the storage controller; obtaining a corresponding speed reference value and operation volume reference value from a database based on device information of the storage controller; determining a volume corresponding to an operation volume abnormity based on a relationship between the real-time speed value and the speed reference value and a relationship between the real-time operation volume value and the operation volume reference (Continued)

value, and adjusting a volume parameter; and continuing to perform the system updating operation based on an adjusted volume parameter.

20 Claims, 3 Drawing Sheets

(58) Field of Classification Search
USPC .................................................. 717/168–178
See application file for complete search history.

(56) References Cited

U.S. PATENT DOCUMENTS

| | | | | |
|---|---|---|---|---|
| 10,768,819 B2* | 9/2020 | Kannan | .................... | G06F 8/654 |
| 2023/0195444 A1* | 6/2023 | Vohra | ...................... | G06F 9/455 |
| | | | | 717/172 |

FOREIGN PATENT DOCUMENTS

| | | |
|---|---|---|
| CN | 111797036 A | 10/2020 |
| CN | 112631832 A | 4/2021 |
| CN | 113806087 A | 12/2021 |
| CN | 114791818 A | 7/2022 |

OTHER PUBLICATIONS

Written Opinion of International Searching Authority of corresponding PCT application (PCT/CN2023/080531) May 23, 2023 including English translation (7 pages).

Search report of corresponding CN priority application (CN202210717906.X) Apr. 17, 2022 (2 pages).

Notification to Grant Patent Right for Invention of corresponding CN priority application (CN202210717906.X) Aug. 3, 2022 including English translation (3 pages).

* cited by examiner

STORAGE CONTROLLER SYSTEM UPDATING METHOD AND SYSTEM, COMPUTER DEVICE, AND STORAGE MEDIUM

CROSS-REFERENCE TO RELATED APPLICATION

This application is the national phase application of International Patent Application No. PCT/CN2023/080531, filed Mar. 9, 2023, which claims priority to Chinese Patent Application No. 202210717906.X, filed with the China National Intellectual Property Administration on Jun. 23, 2022 and entitled "STORAGE CONTROLLER SYSTEM UPDATING METHOD AND SYSTEM, COMPUTER DEVICE, AND STORAGE MEDIUM". The contents of International Patent Application No. PCT/CN2023/080531 and Chinese Patent Application No. 202210717906.X are each incorporated by reference in their entireties.

FIELD

The present application relates to the field of storage controllers, and in particular, to a storage controller system updating method and system, a computer device, and a storage medium.

BACKGROUND

With the development of a storage controller, an upgrading operation needs to be continuously performed on a system of the storage controller, to improve performance of the storage controller. When the system of the storage controller is upgraded, operations may continuously enter the storage controller, and it is necessary to avoid the operations being interrupted. Operation volume carried by the storage controller during upgrading is limited, and a large operation volume may cause problems of an excessively low cache flushing speed and excessively long system upgrading time. The inventor has realized that at present, with regard to this point, a method used in the prior art is to partially stop or reduce the operation volume manually, which consumes time and manpower and seriously affects update efficiency.

SUMMARY

According to an aspect of the present application, a storage controller system updating method is provided. The storage controller system updating method includes:
  performing a system updating operation on a storage controller, and obtaining a real-time speed value and a real-time operation volume value that are generated in response to the system updating operation being performed on the storage controller;
  obtaining a corresponding speed reference value and an operation volume reference value from a database based on device information of the storage controller;
  determining a volume corresponding to an operation volume abnormity based on a relationship between the real-time speed value and the speed reference value and a relationship between the real-time operation volume value and the operation volume reference value, and adjusting a volume parameter; and
  continuing to perform the system updating operation based on an adjusted volume parameter.

In some implementations, the obtaining the corresponding speed reference value and the operation volume reference value from the database based on the device information of the storage controller includes:
  obtaining the device information of the storage controller; and
  in response to the device information of the storage controller being present in the database, obtaining the speed reference value and the operation volume reference value that correspond to the storage controller from the database.

In some implementations, the obtaining the corresponding speed reference value and the operation volume reference value from the database based on the device information of the storage controller includes:
  in response to the device information of the storage controller being not present in the database, determining the speed reference value and the operation volume reference value that are for the storage controller based on a speed reference value and an operation volume reference value that are stored in the database.

In some implementations, the determining the speed reference value and the operation volume reference value that are for the storage controller based on the speed reference value and the operation volume reference value that are stored in the database includes:
  calculating an average value of speed reference values for all storage controllers and an average value of operation volume reference values for all the storage controllers in the database; and
  using the average value of the speed reference values and the average value of the operation volume reference values, which are obtained by calculation, as the speed reference value and the operation volume reference value that are for the storage controller.

In some implementations, the determining the volume corresponding to the operation volume abnormity based on the relationship between the real-time speed value and the speed reference value and the relationship between the real-time operation volume value and the operation volume reference value includes:
  determining the volume corresponding to the operation volume abnormity based on the relationship between the real-time speed value and the speed reference value and a relationship between the real-time operation volume value and a threshold of the operation volume reference value.

In some implementations, the method further includes:
  predefining a value around the operation volume reference value as a threshold of the operation volume reference value.

In some implementations, the determining the volume corresponding to the operation volume abnormity based on the relationship between the real-time speed value and the speed reference value and the relationship between the real-time operation volume value and the threshold of the operation volume reference value includes:
  continuing to perform system updating on the storage controller in response to the real-time speed value of the storage controller being not less than the speed reference value.

In some implementations, the determining the volume corresponding to the operation volume abnormity based on the relationship between the real-time speed value and the speed reference value and the relationship between the real-time operation volume value and the threshold of the operation volume reference value includes:

in response to the real-time speed value of the storage controller being less than the speed reference value, further comparing the real-time operation volume value and the operation volume reference value, to determine the volume corresponding to the operation volume abnormity.

In some implementations, the comparing the real-time operation volume value and the operation volume reference value, to determine the volume corresponding to the operation volume abnormity includes:

obtaining a real-time operation volume value of each volume corresponding to the storage controller; and continuing to perform system updating on the storage controller in response to the real-time operation volume value of each volume corresponding to the storage controller being less than a threshold of the operation volume reference value.

In some implementations, the comparing the real-time operation volume value and the operation volume reference value, to determine the volume corresponding to the operation volume abnormity further includes:

in response to the real-time operation volume value of each volume corresponding to the storage controller being not less than the threshold of the operation volume reference value, determining a volume corresponding to a real-time operation volume value exceeding the threshold of the operation volume reference value as the volume corresponding to the operation volume abnormity.

In some implementations, the adjusting the volume parameter includes:

modifying a quality of service (QOS) value of the volume, to limit an input/output operations per second (IOPS) value to reduce an operation volume.

In some implementations, the obtaining the real-time speed value generated in response to the system updating operation being performed on the storage controller includes:

representing the real-time speed value by using time taken from a failure in attempting to connect the storage controller to a succeed in attempting to connect the storage controller.

In some implementations, after the using the average value of the speed reference values and the average value of the operation volume reference values, which are obtained by calculation, as the speed reference value and the operation volume reference value that are for the storage controller, the method further includes:

storing the average value of the speed reference values and the average value of the operation volume reference values, which are obtained by calculation, in the database associatively with corresponding storage controller device information.

In some implementations, newly stored storage controller device information is indexed during the average value of the speed reference values and the average value of the operation volume reference values, which are obtained by calculation, are stored in the database associatively with the corresponding storage controller device information. The updating method further includes:

querying index information regularly, and sending storage controller device information corresponding to the found index information to operation and maintenance personnel, to prompt the operation and maintenance personnel to update the speed reference value and the operation volume reference value; and receiving and updating, to the database, an updated speed reference value and operation volume reference value obtained by the operation and maintenance personnel.

In some implementations, updating the speed reference value and the operation volume reference value includes:

determining a matched speed reference value and operation volume reference value based on a model number, an operation scenario, and a configuration of the storage controller; and storing the speed reference value and the operation volume reference value that are for the storage controller in the database.

The device information of the storage controller includes the model number, the operation scenario, and the configuration.

The database includes a first database and a second database. The first database stores the speed reference value. The second database stores the operation volume reference value.

In some implementations, one storage controller model number, one operation scenario, and one configuration correspond to one speed reference value and one operation volume reference value.

In some implementations, after the continuing to perform the system updating operation based on the adjusted volume parameter, the method further includes:

continuing to obtain a real-time speed value and a real-time operation volume value in real time, to adjust the volume parameter in real time to ensure normal system updating of the storage controller.

According to another aspect, a storage controller system updating system is provided. The storage controller system updating system includes:

a database module, configured to establish a database, and store a speed reference value and an operation volume reference value that are for a storage controller;

a value comparison module, configured to compare a real-time speed value and the speed reference value, and compare a real-time operation volume value and the operation volume reference value;

a volume query module, configured to query a volume corresponding to a real-time operation volume value exceeding a threshold of the operation volume reference value; and a volume parameter adjustment module, configured to adjust a volume parameter, to reduce an operation volume of the volume.

According to a further aspect, a computer device is provided, including a memory and one or more processors. The memory stores computer-readable instructions. The computer-readable instructions, when executed by the one or more processors, cause the one or more processors to implement the steps of the storage controller system updating method.

According to yet another aspect, one or more non-volatile computer-readable storage media storing computer-readable instructions are provided. The computer-readable instructions, when executed by one or more processors, cause the one or more processors to perform the steps of the storage controller system updating method.

Details of one or more embodiments of the present application will be proposed in the following accompanying drawings and descriptions. Other features and advantages of the present application will become apparent in the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of the present application, and a person of ordinary skill in the art may derive other drawings from these accompanying drawings without creative efforts.

DETAILED DESCRIPTION

In order to make objectives, technical solutions, and advantages of the present application clearer, the following further describes the present application in detail with reference to the accompanying drawings and embodiments. It should be understood that concrete embodiments described herein are merely used to explain the present application but are not intended to limit the present application.

A system of a storage controller needs to be continuously upgraded, to improve performance of the storage controller. When the system of the storage controller is upgraded, an operation may continuously enter the storage controller, and it is necessary to ensure that the operation is not interrupted. An operation volume carried by the storage controller during upgrading is limited, and a large operation volume may cause problems of an excessively low cache flushing speed and excessively long system upgrading time. At present, with regard to this point, a method used in the prior art is to partially stop or reduce the operation volume manually, which consumes time and manpower and seriously affects update efficiency. In view of this, the present application proposes a storage controller system updating method and system, a computer device, and a storage medium. In the present application, device information of a storage controller includes a model number, an operation scenario, and a configuration. One model number, one operation scenario, and one configuration correspond to one speed reference value and one operation volume reference value. Different model numbers, operation scenarios, and configurations correspond to different speed reference values and operation volume reference values. Therefore, a database is established to store speed reference values and operation volume reference values under different model numbers, operation scenarios, and configurations. When system updating is performed on one storage controller, a corresponding speed reference value and operation volume reference value are first obtained from the database based on device information of the storage controller. When a real-time speed value is less than the speed reference value, and a real-time operation volume value exceeds a threshold of the operation volume reference value, a parameter of a volume corresponding to a real-time operation volume value exceeding the threshold of the operation volume reference value is adjusted, that is, a quality operation value is adjusted, to limit an IOPS value to reduce an operation volume. In this way, automatic adjustment is implemented, and storage controller system updating efficiency is greatly improved.

Figure 1:
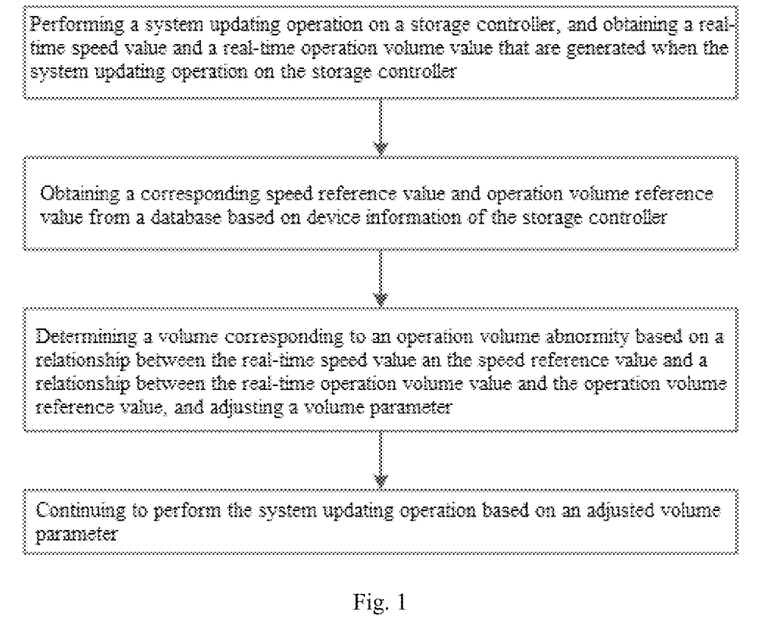
FIG. 1 is a first method flowchart of a storage controller system updating method according to one or more embodiments of the present application.
Figure 2:
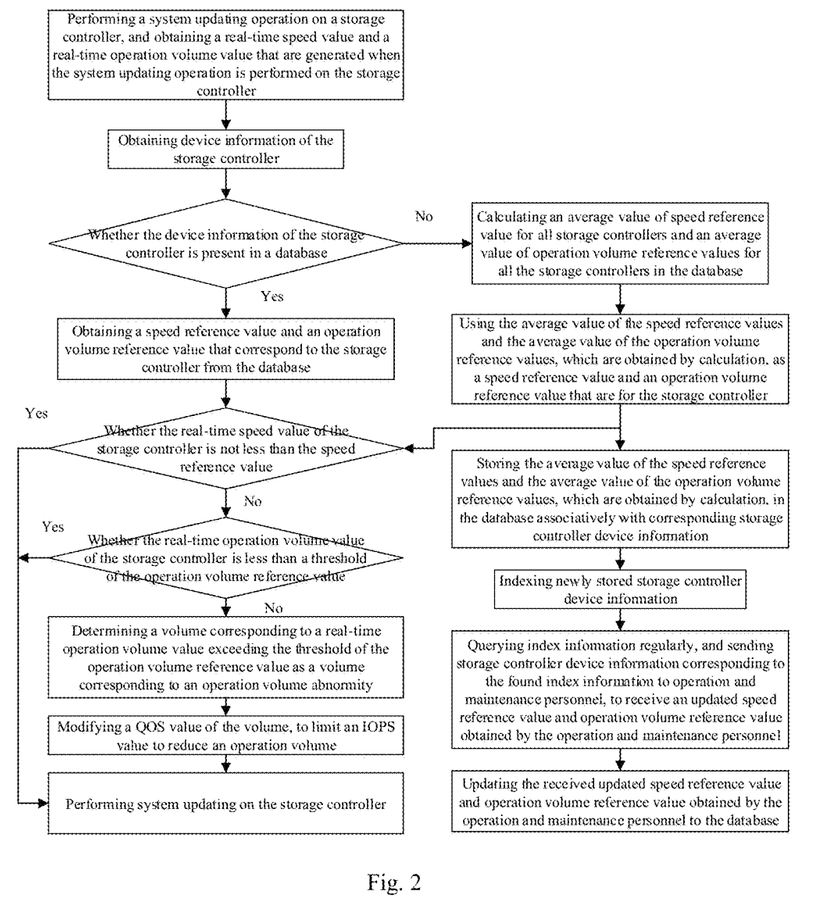
FIG. 2 is a second method flowchart of a storage controller system updating method according to one or more embodiments of the present application.

For the method in some embodiments of the present application, referring to FIG. 1 and FIG. 2. FIG. 1 is a first method flowchart of the storage controller system updating method according to the present application. FIG. 2 is a second method flowchart of the storage controller system updating method according to the present application.

Application of the storage controller system updating method to the computer device is used as an example for description. The method includes the following steps A system updating operation is performed on a storage controller, and a real-time speed value and a real-time operation volume value that are generated when the system updating operation is performed on the storage controller are obtained.

To subsequently adjust a volume parameter in time to reduce an operation volume, the real-time speed value and the real-time operation volume value of the storage controller need to be obtained, to compare the real-time speed value and the speed reference value and compare the real-time operation volume value and the operation volume reference value to further construct a feedback mechanism. This helps adjusting the volume parameter in time to reduce the operation volume of the storage controller and improving storage controller system updating efficiency. The operation volume of the storage controller includes IOPS and a read/write size (a data block size). Reducing the IOPS can reduce the operation volume of the storage controller. Further, for example, a double-controller scenario includes two storage controllers. When system updating is performed on a first storage controller, an operation to be performed of the first storage controller needs to be transferred to a second storage controller, to ensure that the operation is normally performed. Transferring the operation from the first storage controller to the second storage controller is referred to a flushing operation. In a complex actual application scenario, excessive IOPS, that is, an excessively large operation volume, may cause a low flushing operation speed or even a shutdown, which may seriously affect operation processing efficiency. In addition, the operation volume cannot be automatically adjusted, greatly reducing the storage controller system updating efficiency. Therefore, the feedback mechanism may be constructed by comparing the real-time speed value and the speed reference value and comparing the real-time operation volume value and the operation volume reference value, to effectively improve the operation processing efficiency and effectively improve the storage controller system updating efficiency.

A corresponding speed reference value and operation volume reference value are obtained from a database based on device information of the storage controller.

To improve the storage controller system updating efficiency, the speed reference value and the operation volume reference value that correspond to the storage controller need to be first obtained before system updating is performed on the storage controller. One storage controller model number, one operation scenario, and one configuration correspond to one speed reference value and one operation volume reference value. The storage controller model number means storage controllers of different model numbers. The operation scenario includes double-controller, active-active, and eight-controller operation scenarios, and the like. The configuration includes a quantity of hard disks, a quantity of cores of a central processing unit (CPU), a size of a hard disk, and another configuration. Therefore, the corresponding speed reference value and operation volume reference value need to be obtained from the database based on the device information of the storage controller, to obtain the speed reference value and the operation volume reference value that correspond to the storage controller. For storage controllers of different model numbers having different configurations and applied to different operation scenarios, different speed reference values and operation volume reference values are correspondingly used, and these speed reference values and operation volume reference values do not need to be determined by a person, and are stored in the database and automatically obtained. Therefore, the storage controller system updating efficiency is greatly improved, particularly when there are many storage controllers.

A volume corresponding to an operation volume abnormity is determined based on a relationship between the real-time speed value and the speed reference value and a relationship between the real-time operation volume value and the operation volume reference value, and a volume parameter is adjusted.

After the real-time speed value and the real-time operation volume value that are generated when the system updating operation is performed on the storage controller are obtained, and the corresponding speed reference value and operation volume reference value are obtained from the database based on the device information of the storage controller, the real-time speed value is compared with the speed reference value, and the real-time operation volume value is compared with the operation volume reference value. After comparison, the volume corresponding to the operation volume abnormity may be determined based on the relationship between the real-time speed value and the speed reference value and the relationship between the real-time operation volume value and the operation volume reference value, and then the volume parameter is adjusted. Adjusting the volume parameter can reduce the operation volume to a normal level, to ensure that the system updating operation is normally performed on the storage controller. This greatly improves the storage controller system updating efficiency.

The system updating operation continues to be performed based on an adjusted volume parameter.

After the volume parameter corresponding to the operation volume abnormity is adjusted, the system updating operation continues to be performed based on the adjusted volume parameter. Therefore, the operation volume can be reduced to the normal level, to ensure that the system updating operation is normally performed on the storage controller. This greatly improves the storage controller system updating efficiency.

In some implementations, that a corresponding speed reference value and operation volume reference value from a database based on device information of the storage controller includes the following steps.

The device information of the storage controller is obtained, and whether the device information of the storage controller is present in the database is determined.

The speed reference value and the operation volume reference value that correspond to the storage controller are obtained based on the device information of the storage controller. The device information of the storage controller and the corresponding speed reference value and operation volume reference value may not be stored in the database. Therefore, that whether the device information of the storage controller is present in the database needs to be determined first.

If the device information of the storage controller is present in the database, the speed reference value and the operation volume reference value that correspond to the storage controller are obtained from the database.

It is determined whether the device information of the storage controller is present in the database. If the device information of the storage controller is present in the database, it indicates that the device information of the storage controller and the corresponding speed reference value and operation volume reference value have been stored in the database, and the corresponding speed reference value and operation volume reference value may be obtained based on only the device information of the storage controller, that is, based on a model number, an operation scenario, and a configuration of the storage controller.

If the device information of the storage controller is not present in the database, the speed reference value and the operation volume reference value that are for the storage controller are determined based on a speed reference value and an operation volume reference value that are stored in the database.

It is determined whether the device information of the storage controller is present in the database. If the device information of the storage controller is not present in the database, it indicates that the storage controller is of a new model number, or the device information of the storage controller and the corresponding speed reference value and operation volume reference value have not been stored in the database. Therefore, the speed reference value and the operation volume reference value that are for the storage controller need to be predetermined based on the speed reference value and the operation volume reference value that are stored in the database, and then comparison between the real-time speed value and the speed reference value and comparison between the real-time operation volume value and the operation volume reference value are performed based on the predetermined speed reference value and operation volume reference value that are for the storage controller.

In some implementations, that the speed reference value and the operation volume reference value that are for the storage controller are determined based on a speed reference value and an operation volume reference value that are stored in the database includes the following steps.

An average value of speed reference values for all storage controllers and an average value of operation volume reference values for all the storage controllers in the database are calculated.

If the device information of the storage controller is not present in the database, the speed reference value and the operation volume reference value that are for the storage controller need to be predetermined based on the speed reference value and the operation volume reference value that are stored in the database. The average value of the speed reference values for all the storage controllers in the database is calculated, and the average value of the operation volume reference values for all the storage controllers in the database is calculated. The average value of the speed reference values and the average value of the operation volume reference values, which are obtained by calculation, are used in advance as the speed reference value and the operation volume reference value that are for the storage controller, to compare the real-time speed value and the speed reference value and compare the real-time operation volume value and the operation volume reference value.

The average value of the speed reference values and the average value of the operation volume reference values, which are obtained by calculation, are used as the speed reference value and the operation volume reference value that are for the storage controller.

When the device information of the storage controller is not present in the database, the average value of the speed reference values and the average value of the operation volume reference values, which are obtained by calculation, are used in advance as the speed reference value and the operation volume reference value that are for the storage controller, to compare the real-time speed value and the speed reference value and compare the real-time operation volume value and the operation volume reference value.

In some implementations, that a volume corresponding to an operation volume abnormity based on a relationship between the real-time speed value and the speed reference value and a relationship between the real-time operation volume value and the operation volume reference value includes:

determining the volume corresponding to the operation volume abnormity based on the relationship between the real-time speed value and the speed reference value and a relationship between the real-time operation volume value and a threshold of the operation volume reference value.

After the real-time speed value and the real-time operation volume value that are generated when the system updating operation is performed on the storage controller are obtained, and the corresponding speed reference value and operation volume reference value are obtained from the database based on the device information of the storage controller, the real-time speed value is compared with the speed reference value, and the real-time operation volume value is compared with the threshold of the operation volume reference value. After comparison, the volume corresponding to the operation volume abnormity may be determined based on the relationship between the real-time speed value and the speed reference value and the relationship between the real-time operation volume value and the threshold of the operation volume reference value, and then the volume parameter is adjusted. Adjusting the volume parameter can reduce the operation volume to a normal level, to ensure that the system updating operation is normally performed on the storage controller. This greatly improves the storage controller system updating efficiency. The threshold of the operation volume reference value is preferably 80% of the operation volume reference value.

In some implementations, the determining the volume corresponding to the operation volume abnormity based on the relationship between the real-time speed value and the speed reference value and a relationship between the real-time operation volume value and a threshold of the operation volume reference value includes the following steps.

It is determined whether the real-time speed value of the storage controller is not less than the speed reference value.

After the real-time speed value and the real-time operation volume value of the storage controller are obtained, it is necessary to first compare the real-time speed value of the storage controller and the speed reference value, that is, determine whether the real-time speed value of the storage controller is not less than the speed reference value. Comparing the real-time speed value of the storage controller and the speed reference value helps subsequently reducing the operation volume in a case of an excessively large operation volume and preventing phenomena of a low flushing operation speed and long waiting time.

System updating continues to be performed on the storage controller if the real-time speed value of the storage controller is not less than the speed reference value.

If the real-time speed value of the storage controller is not less than the speed reference value, that is, the real-time speed value of the storage controller is greater than the speed reference value, it indicates that the system updating operation on the storage controller is normal, and the system updating operation continues to be performed on the storage controller.

If the real-time speed value of the storage controller is less than the speed reference value, the real-time operation volume value and the operation volume reference value are further compared, to determine the volume corresponding to the operation volume abnormity.

If the real-time speed value of the storage controller is less than the speed reference value, it indicates that an actual system updating speed of the storage controller decreases, and there is an abnormity. This is generally because the operation volume of the storage controller is excessively large, resulting in a low flushing operation speed and a resource congestion. In this case, it is necessary to further compare the real-time operation volume value and the operation volume reference value, that is, to further determine whether the real-time operation volume value of the storage controller is less than the threshold of the operation volume reference value, to determine the volume corresponding to the operation volume abnormity.

In some implementations, that the real-time operation volume value and the operation volume reference value are compared, to determine the volume corresponding to the operation volume abnormity includes the following steps.

A real-time operation volume value of each volume corresponding to the storage controller is obtained.

Each storage controller performs a read/write operation on a plurality of corresponding volumes when performing an operation. Therefore, to determine the volume corresponding to the operation volume abnormity, the real-time operation volume value of each volume corresponding to the storage controller needs to be obtained, and then the real-time operation volume value of each volume is compared with a threshold of the operation volume reference value.

It is determined whether the real-time operation volume value of each volume corresponding to the storage controller is less than the threshold of the operation volume reference value.

After it is determined that the real-time speed value of the storage controller is less than the speed reference value, it is necessary to compare the real-time operation volume value and the operation volume reference value, that is, to determine whether the real-time operation volume value of each volume corresponding to the storage controller is less than the threshold of the operation volume reference value. Generally, there may be a reference value for the operation volume. When the operation volume processed by the storage controller is around the reference value, the operation processing efficiency of the storage controller is greatly reduced, resulting in a low flushing operation speed. Therefore, a value around the operation volume reference value, that is, the threshold of the operation volume reference value, needs to be defined. The threshold of the operation volume reference value is used as a boundary, and exceeding the threshold of the operation volume reference value indicates that a continuous increase of the operation volume may cause the low flushing operation speed. When the threshold of the operation volume reference value is exceeded, the volume parameter needs to be adjusted, to reduce the operation volume to present the low flushing operation speed.

System updating continues to be performed on the storage controller if the real-time operation volume value of each volume corresponding to the storage controller is less than the threshold of the operation volume reference value.

It is determined whether the real-time operation volume value of each volume corresponding to the storage controller is less than the threshold of the operation volume reference value. If the real-time operation volume value of each volume corresponding to the storage controller is less than the threshold of the operation volume reference value, it indicates that the operation volume is normal, and it is only necessary to continue to perform system updating on the storage controller.

If the real-time operation volume value of each volume corresponding to the storage controller is not less than the threshold of the operation volume reference value, a volume corresponding to a real-time operation volume value exceeding the threshold of the operation volume reference value is determined as the volume corresponding to the operation volume abnormity.

It is determined whether the real-time operation volume value of each volume corresponding to the storage controller is less than the threshold of the operation volume reference value. If the real-time operation volume value of each volume corresponding to the storage controller is not less than the threshold of the operation volume reference value, it indicates that the operation volume is excessively large. In this case, the volume corresponding to the real-time operation volume value exceeding the threshold of the operation volume reference value, that is, the volume corresponding to the operation volume abnormity, needs to be obtained by query, and after the volume is found, the parameter is adjusted, to reduce the operation volume of the volume. This reduces an operation load of the storage controller, and avoids a low flushing operation speed. In addition, within the speed reference value of the storage controller, the operation volume may keep increasing within the threshold of the operation volume reference value.

In some implementations, that a volume parameter is adjusted includes:
    modifying a QOS value of the volume, to limit an IOPS value to reduce the operation volume.

After the volume corresponding to the real-time operation volume value exceeding the threshold of the operation volume reference value is obtained, a parameter of the volume is modified, that is, the QOS value of the volume is modified. Modifying the QOS value can limit the IOPS value. After the IOPS value is limited, the operation volume is limited. Therefore, the operation load of the storage controller is reduced, and the low flushing operation speed is avoided.

In some implementations, that a real-time speed value generated when the system updating operation is performed on the storage controller is obtained includes:
    representing the real-time speed value by using time taken from a failure in attempting to connect the storage controller to a succeed in attempting to connect the storage controller.

The double-controller application scenario is used as an example, which includes two storage controllers, wherein each storage controller may process an operation. When system updating needs to be performed on a first storage controller, to avoid the operation being interrupted, a flushing operation is performed to transfer the operation corresponding to the first storage controller to a second storage controller, to perform system updating on the first storage controller. During system updating, a host is not allowed to be connected to the storage controller. The real-time speed value is obtained by the following method: attempting to connect the storage controller on which system updating is performed, and using the time taken from a first failure in attempting to connect the storage controller to the success in attempting to connect the storage controller as the real-time speed value of the storage controller, that is, using time for updating one storage controller as the real-time speed value.

In some implementations, after the average value of the speed reference values and the average value of the operation volume reference values, which are obtained by calculation, are used as the speed reference value and the operation volume reference value that are for the storage controller, the method further includes:
    storing the average value of the speed reference values and the average value of the operation volume reference values, which are obtained by calculation, in the database associatively with corresponding storage controller device information.

After the average value of the speed reference values and the average value of the operation volume reference values, which are obtained by calculation, are used as the speed reference value and the operation volume reference value that are for the storage controller, the average value of the speed reference values and the average value of the operation volume reference values, which are obtained by calculation, are stored in the database associatively with the corresponding storage controller device information, so that operation and maintenance personnel invoke, from the database, the speed reference value and the operation volume reference value that correspond to the device information if not adding in time the device information and the corresponding speed reference value and operation volume reference value.

In some implementations, newly stored storage controller device information is indexed while the average value of the speed reference values and the average value of the operation volume reference values, which are obtained by calculation, are stored in the database associatively with the corresponding storage controller device information. The updating method further includes:
    querying index information regularly, and sending storage controller device information corresponding to the found index information to operation and maintenance personnel, to prompt the operation and maintenance personnel to update the speed reference value and the operation volume reference value.

The newly stored storage controller device information is indexed while the average value of the speed reference values and the average of the operation volume reference values, which are obtained by calculation, are stored in the database associatively with the corresponding storage controller device information, so that the operation and maintenance personnel can subsequently update in time the speed reference value and the operation volume reference value that are for the indexed storage controller. After the newly stored storage controller device information is indexed, time for regularly querying the index information is set to query the index information regularly, and the storage controller device information corresponding to the found index information is sent to the operation and maintenance personnel, to prompt the operation and maintenance personnel to update the speed reference value and the operation volume reference value. Further, after receiving the index information, the operation and maintenance personnel determine the matched speed reference value and operation volume reference value based on a past empirical value, and the model number, the operation scenario, and the configuration of the storage controller, and then update the speed reference value and the operation volume reference value that are for the indexed storage controller to overwrite an average value of speed reference values and an average value of operation volume reference values, which are obtained before, to subsequently invoke the updated speed reference value and operation volume reference value.

An updated speed reference value and operation volume reference value obtained by the operation and maintenance personnel are received and updated to the database.

After receiving the index information, the operation and maintenance personnel determine the matched speed reference value and operation volume reference value based on the past empirical value, and the model number, the operation scenario, and the configuration of the storage controller. The updated speed reference value and operation volume reference value obtained by the operation and maintenance personnel are received and updated to the database, to overwrite the average value of the speed reference values and the average value of the operation volume reference values, which are obtained before, in the database to subsequently invoke the updated speed reference value and operation volume reference value.

In some implementations, that the speed reference value and the operation volume reference value are updated includes the following steps.

A matched speed reference value and operation volume reference value are determined based on the model number, the operation scenario, and the configuration of the storage controller.

In an actual application scenario, if storage controllers of different model numbers are used, and the storage controllers have different configurations and are applied to different operation scenarios, different speed reference values and operation volume reference values may be used. One storage controller model number, one operation scenario, and one configuration correspond to one speed reference value and one operation volume reference value. Therefore, different speed reference values and operation volume reference values are used under different model numbers, different operation scenarios, and different configurations, and the operation and maintenance personnel determine matched speed reference values and operation volume reference values based on storage controllers with different device information.

The speed reference value and the operation volume reference value that are for the storage controller are stored in the database.

After determining the matched speed reference values and operation volume reference values based on the storage controllers with the different device information, the operation and maintenance personnel may store the speed reference value and the operation volume reference value that are for the storage controller in the database, to subsequently invoke information for system updating of the storage controller.

The device information of the storage controller includes the model number, the operation scenario, and the configuration.

The database includes a first database and a second database. The first database stores the speed reference value. The second database stores the operation volume reference value.

The device information of the storage controller includes the model number of the storage controller, a concrete operation scenario of the storage controller, and the configuration of the storage controller. The database is partitioned into two databases: the first database and the second database, wherein the first database is configured to store the speed reference value, and the second database is configured to store the operation volume reference value. Setting the database can implement comparison between the real-time speed value and the speed reference value and comparison between the real-time operation volume value and the operation volume reference value, to establish the feedback mechanism to adjust the volume parameter, so as to reduce the operation volume and prevent the low flushing operation speed.

In some implementations, after that the system updating operation continues to be performed based on an adjusted volume parameter, the method further includes:

continuing to obtain a real-time speed value and a real-time operation volume value in real time, to adjust the volume parameter in real time to ensure normal system updating of the storage controller.

After the system updating operation continues to be performed based on the adjusted volume parameter, the real-time speed value and the real-time operation volume value continue to be obtained in real time, to adjust the volume parameter in real time to ensure normal system updating of the storage controller.

Referring to FIG. 2. FIG. 2 is the second method flowchart of the storage controller system updating method according to the present application.

A system updating operation is performed on a storage controller, and a real-time speed value and a real-time operation volume value that are generated when the system updating operation is performed on the storage controller are obtained.

To subsequently adjust a volume parameter in time to reduce an operation volume, the real-time speed value and the real-time operation volume value of the storage controller need to be obtained, to compare the real-time speed value and the speed reference value and compare the real-time operation volume value and the operation volume reference value to further construct a feedback mechanism. This helps adjusting the volume parameter in time to reduce the operation volume of the storage controller and improving storage controller system updating efficiency.

Device information of the storage controller is obtained, and it is determined whether the device information of the storage controller is present in a database.

If the device information of the storage controller is present in the database, the speed reference value and the operation volume reference value that correspond to the storage controller are obtained from the database.

If the device information of the storage controller is not present in the database, an average value of speed reference values for all storage controllers in the database and an average value of operation volume reference values for all the storage controllers are calculated, and the average value of the speed reference values and the average value of the operation volume reference values, which are obtained by calculation, are used as the speed reference value and the operation volume reference value that are for the storage controller.

The speed reference value and the operation volume reference value that correspond to the storage controller need to be obtained based on the device information of the storage controller. The device information of the storage controller and the corresponding speed reference value and operation reference value may not be stored in the database. Therefore, whether the device information of the storage controller is present in the database needs to be first determined. If the device information of the storage controller is present in the database, it indicates that the device information of the storage controller and the corresponding speed reference value and operation volume reference value have been stored in the database, and the corresponding speed reference value and operation volume reference value may be obtained based on only the device information of the storage controller, that is, based on a model number, an operation scenario, and a configuration of the storage controller. If the device information of the storage controller is not present in the database, it indicates that the storage controller is of a new model number, or the device information of the storage controller and the corresponding speed reference value and operation volume reference value have not been stored in the database, so that the average value of the speed reference values and the average value of the operation volume reference values, which are obtained by calculation, need to be used as the speed reference value and the operation volume reference value that are for the storage controller.

The average value of the speed reference values and the average value of the operation volume reference values, which are obtained by calculation, are stored in the database associatively with corresponding storage controller device information.

After the average value of the speed reference values and the average value of the operation volume reference values, which are obtained by calculation, are used as the speed reference value and the operation volume reference value that are for the storage controller, the average value of the speed reference values and the average value of the operation volume reference values, which are obtained by calculation, are stored in the database associatively with the corresponding storage controller device information, so that operation and maintenance personnel invoke, from the database, the speed reference value and the operation volume reference value that correspond to the device information if not adding in time the device information and the corresponding speed reference value and operation volume reference value.

Newly stored storage controller device information is indexed.

The newly stored storage controller device information is indexed while the average value of the speed reference values and the average of the operation volume reference values, which are obtained by calculation, are stored in the database associatively with the corresponding storage controller device information, so that the operation and maintenance personnel can subsequently update in time the speed reference value and the operation volume reference value that are for the indexed storage controller.

Index information is queried regularly, and storage controller device information corresponding to the found index information is sent to the operation and maintenance personnel, to prompt the operation and maintenance personnel to update the speed reference value and the operation volume reference value.

After the newly stored storage controller device information is indexed, time for regularly querying the index information is set to query the index information regularly, and the storage controller device information corresponding to the found index information is sent to the operation and maintenance personnel, to prompt the operation and maintenance personnel to update the speed reference value and the operation volume reference value.

An updated speed reference value and operation volume reference value obtained by the operation and maintenance personnel are received and updated to the database.

After receiving the index information, the operation and maintenance personnel determine the matched speed reference value and operation volume reference value based on the past empirical value, and the model number, the operation scenario, and the configuration of the storage controller. The updated speed reference value and operation volume reference value obtained by the operation and maintenance personnel are received and updated to the database, to overwrite the average value of the speed reference values and the average value of the operation volume reference values, which are obtained before, in the database to subsequently invoke the updated speed reference value and operation volume reference value.

It is determined whether the real-time speed value of the storage controller is not less than the speed reference value.

System updating continues to be performed on the storage controller if the real-time speed value of the storage controller is not less than the speed reference value.

It is further determined whether the real-time operation volume value of the storage controller is less than a threshold of the operation volume reference value if the real-time speed value of the storage controller is less than the speed reference value.

If the real-time speed value of the storage controller is not less than the speed reference value, that is, the real-time speed value of the storage controller is greater than the speed reference value, it indicates that the system updating operation on the storage controller is normal, and the system updating operation continues to be performed on the storage controller. If the real-time speed value of the storage controller is less than the speed reference value, it indicates that an actual system updating speed of the storage controller decreases, and there is an abnormity. This is generally because the operation volume of the storage controller is excessively large, resulting in a low flushing operation speed and a resource congestion. In this case, it is necessary to further determine whether the real-time operation volume value of the storage controller is less than the threshold of the operation volume reference value.

System updating continues to be performed on the storage controller if the real-time operation volume value of the storage controller is less than the threshold of the operation volume reference value.

If the real-time operation volume value of the storage controller is not less than the threshold of the operation volume reference value, a volume corresponding to a real-time operation volume value exceeding the threshold of the operation volume reference value is determined as a volume corresponding to an operation volume abnormity.

If the real-time operation volume value of the storage controller is less than the threshold of the operation volume reference value, it indicates that the operation volume is normal, and it is only necessary to perform system updating on the storage controller. If the real-time operation volume value of the storage controller is not less than the threshold of the operation volume reference value, it indicates that the operation volume is excessively large, and the volume corresponding to the real-time operation volume value exceeding the threshold of the operation volume reference value, that is, the volume corresponding to the operation volume abnormity, needs to be obtained by query.

A QOS value of the volume is modified, to limit an IOPS value to reduce the operation volume.

After the volume corresponding to the real-time operation volume value exceeding the threshold of the operation volume reference value is obtained, a parameter of the volume is modified, that is, a QOS value of the volume is modified. Modifying the QOS value can limit the IOPS value. After the IOPS value is limited, the operation volume is limited. Therefore, an operation load of the storage controller is reduced, and the low flushing operation speed is avoided.

It should be understood that although the steps in the flowcharts in FIG. 1 and FIG. 2 are sequentially presented according to indications of arrowheads, these steps are not necessarily performed in sequences indicated by the arrowheads. Unless otherwise explicitly specified herein, execution of the steps is not strictly limited, and the steps may be performed in other sequences. Moreover, at least some steps in FIG. 1 and FIG. 2 may include a plurality of sub-steps or a plurality of phases. The sub-steps or phases are not necessarily performed at the same time, and may be performed at different time. The sub-steps or phases are not necessarily performed in order, and may be performed in turn or alternately with other steps or at least some sub-steps or phases of other steps.

Figure 3:
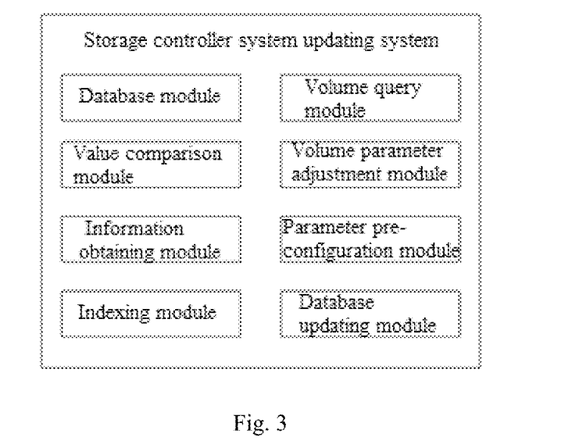
FIG. 3 is a diagram of a system structure of a storage controller system updating system according to one or more embodiments of the present application.

Referring to FIG. 3. FIG. 3 is a diagram of a system structure of the storage controller system updating system according to the present application.

The storage controller system updating system according to some embodiments of the present application includes the following modules.

A database module is configured to establish a database, and store a speed reference value and an operation volume reference value that are for a storage controller.

Device information of the storage controller includes a model number of the storage controller, a concrete operation scenario of the storage controller, and a configuration of the storage controller. The database is partitioned into two databases (that is, data block modules): a first database and a second database, wherein the first database is configured to store the speed reference value, and the second database is configured to store the operation volume reference value. Setting the database can implement comparison between a real-time speed value and the speed reference value and comparison between a real-time operation volume value and the operation volume reference value, to establish a feedback mechanism to adjust a volume parameter, so as to reduce an operation volume and prevent a low flushing operation speed. The database needs to be pre-established before system updating is performed on the storage controller, so as to prepare for storing the speed reference value and the operation volume reference value.

A value comparison module is configured to compare the real-time speed value and the speed reference value, and compare the real-time operation volume value and the operation volume reference value.

After the real-time speed value and the real-time operation volume value of the storage controller are obtained, it is necessary to first compare the real-time speed value of the storage controller and the speed reference value, that is, to determine whether the real-time speed value of the storage controller is not less than the speed reference value. Comparing the real-time speed value of the storage controller and the speed reference value helps subsequently reducing the operation volume in a case of an excessively large operation volume and preventing phenomena of a low flushing operation speed and long waiting time. After it is determined that the real-time speed value of the storage controller is less than the speed reference value, it is necessary to compare the real-time operation volume value and the operation volume reference value, that is, to determine whether the real-time operation volume value of the storage controller is less than a threshold of the operation volume reference value. The value comparison module implements comparison between the real-time speed value and the speed reference value and comparison between the real-time operation volume value and the threshold of the operation volume reference value.

A volume query module is configured to query a volume corresponding to a real-time operation volume value exceeding the threshold of the operation volume reference value.

After it is determined that the real-time operation volume value exceeds the threshold of the operation volume reference value, it indicates that the operation volume is excessively large. In this case, the volume query module needs to obtain the volume corresponding to the real-time operation volume value exceeding the threshold of the operation volume reference value, and after the volume is found, the parameter is adjusted, to reduce an operation volume of the volume. This reduces an operation load of the storage controller, and avoids a low flushing operation speed.

A volume parameter adjustment module is configured to adjust a volume parameter, to reduce the operation volume of the volume.

After the volume corresponding to the real-time operation volume value exceeding the threshold of the operation volume reference value is obtained, the volume parameter adjustment module modifies the parameter of the volume, that is, modifies a QOS value of the volume. Modifying the QOS value can limit an IOPS value. After the IOPS value is limited, the operation volume is limited. Therefore, the operation load of the storage controller is reduced, and the low flushing operation speed is avoided.

An information obtaining module is configured to obtain the device information of the storage controller.

The speed reference value and the operation volume reference value that correspond to the storage controller are obtained based on the device information of the storage controller. The information obtaining module obtains the device information of the storage controller.

A parameter pre-configuration module is configured to use an average value of speed reference values and an average value of operation volume reference values, which are obtained by calculation, as the speed reference value and the operation volume reference value that are for the storage controller.

The parameter pre-configuration module calculates the average value, that is, calculates the average value of all the speed reference values in the database and the average value of all the operation volume reference values, and uses in advance the average value of the speed reference values and the average value of the operation volume reference values, which are obtained by calculation, as the speed reference value and the operation volume reference value that are for the storage controller, to compare the real-time speed value and the speed reference value and compare the real-time operation volume value and the operation volume reference value.

An indexing module is configured to index newly stored storage controller device information, query index information regularly, and send storage controller device information corresponding to the found index information to operation and maintenance personnel, to prompt the operation and maintenance personnel to update the speed reference value and the operation volume reference value.

The indexing module indexes the newly stored storage controller device information while the average value of the speed reference values and the average value of the operation volume reference values, which are obtained by calculation, are stored in the database associatively with the corresponding storage controller device information. After the newly stored storage controller device information is indexed, time for regularly querying the index information is set to query the index information regularly through the indexing module, and the storage controller device information corresponding to the found index information is sent to the operation and maintenance personnel, to prompt the operation and maintenance personnel to update the speed reference value and the operation volume reference value.

A database updating module is configured to receive and update, to the database, an updated speed reference value and operation volume reference value obtained by the operation and maintenance personnel After receiving the index information, the operation and maintenance personnel determine a matched speed reference value and operation volume reference value based on a past empirical value, and the model number, the operation scenario, and the configuration of the storage controller. The updated speed reference value and operation volume reference value obtained by the operation and maintenance personnel are received and updated to the database, to overwrite an average value of speed reference values and an average value of operation volume reference values, which are obtained before, in the database to subsequently invoke the updated speed reference value and operation volume reference value.

For certain limitations on the storage controller system updating system, refer to the above limitations on the method. Details are not described herein again. All or part of the modules in the storage controller system updating system may be implemented by software, hardware, or a combination thereof. Each module may be embedded into or independent of a processor in a computer device in a hardware form, or may be stored in a software form in a memory in a computer device, for the processor to invoke to perform the operation corresponding to each module.

Some embodiments of the present application provide a computer device, including at least one processor and a memory. The memory stores computer-readable instructions runnable on the processor. The computer-readable instructions are executed by the processor to implement the steps of the storage controller system updating method.

Figure 4:
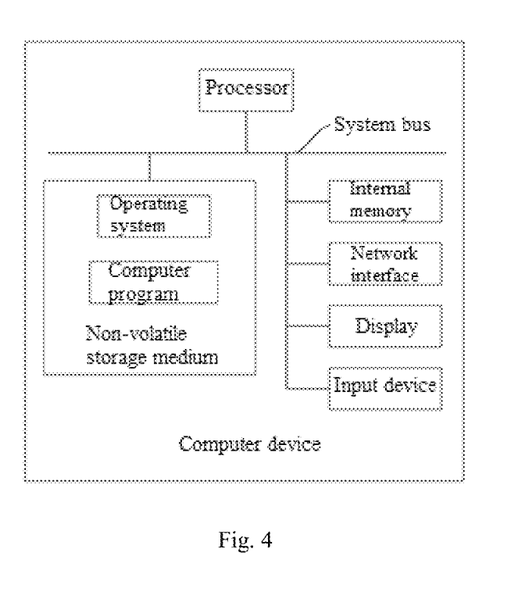
FIG. 4 is a diagram of a device structure of a computer device according to one or more embodiments of the present application.

The computer device may be a terminal, whose internal structure may be as shown in FIG. 4. The computer device includes the processor, the memory, a network interface, a display, and an input apparatus that are connected through a system bus. The processor of the computer device is configured to provide calculation and control capabilities. The memory of the computer device includes a non-volatile storage medium and an internal memory. The non-volatile storage medium stores an operating system and a computer program. The internal memory provides a running environment for the operating system and the computer program in the non-volatile storage medium. The network interface of the computer device is configured to be connected to an external terminal for communication through a network. The computer program is executed by the processor to implement a storage controller system updating method. The display of the computer device may be a liquid crystal display or an e-in display. The input apparatus of the computer device may be a touch layer on the display, may be a button, a trackball, or a touchpad arranged on a housing of the computer device, or may be an external keyboard, touchpad, or mouse.

A person skilled in the art should know that the structure shown in FIG. 4 is merely a block diagram of a partial structure related to the solutions of the present application and not intended to limit the computer device to which the solutions of the present application are applied. The computer device may include more or fewer components than those shown in the figure, some components are combined, or different component arrangements are used.

In some implementations, a computer device is provided, including at least one processor and a memory. The memory stores computer-readable instructions runnable on the processor. The computer-readable instructions are executed by the processor to implement the following steps:

performing a system updating operation on a storage controller, and obtaining a real-time speed value and a real-time operation volume value that are generated when the system updating operation is performed on the storage controller;

obtaining a corresponding speed reference value and operation volume reference value from a database based on device information of the storage controller;

determining a volume corresponding to an operation volume abnormality based on a relationship between the real-time speed value and the speed reference value and a relationship between the real-time operation volume value and the operation volume reference value, and adjusting a volume parameter; and continuing to perform the system updating operation based on an adjusted volume parameter.

In some embodiments of the present application, a non-volatile computer-readable memory medium in provided. The non-volatile computer-readable storage medium stores computer-readable instructions. The computer-readable instructions are executed by a processor to implement the following steps:

performing a system updating operation on a storage controller, and obtaining a real-time speed value and a real-time operation volume value that are generated when the system updating operation is performed on the storage controller;

obtaining a corresponding speed reference value and operation volume reference value from a database based on device information of the storage controller;

determining a volume corresponding to an operation volume abnormality based on a relationship between the real-time speed value and the speed reference value and a relationship between the real-time operation volume value and the operation volume reference value, and adjusting a volume parameter; and continuing to perform the system updating operation based on an adjusted volume parameter.

It can be understood by a person of ordinary skill in the art that all or part of the processes in the method of the embodiments may be completed by a computer program by instructing related hardware. The computer program may be stored in a non-volatile computer-readable storage medium. When the computer program is executed, the processes of each of the method embodiments may be included. Any memory, storage, database, or other medium used by reference in each embodiment provided in the present application may include non-volatile and/or volatile memories. The non-volatile memory may include a read-only memory (ROM), a programable ROM (PROM), an electrically programmable ROM (EPROM), an electrically erasable program (EEPROM), or a flash memory. The volatile memory may include a random access memory (RAM) or an external cache. As an example rather than a restriction, the RAM may be obtained in various forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct RDRAM (DRDRAM), and a rambus dynamic RAM (RDRAM).

Technical features in the foregoing embodiments may be freely combined. For brevity of description, not all possible combinations of the technical features in the foregoing embodiments are described. However, combinations of these technical features shall be considered as falling within the scope recorded in this specification provided that no conflict exists.

The foregoing embodiments merely illustrate several implementations of the present application, and the description thereof is concretely and detailed, but it should not be construed as a limitation on the patent scope of the present application. It should be noted that a person of ordinary skill in the art may further make a plurality of transformations and improvements without departing from the concept of the present application, and the transformations and improvements shall fall within the protection scope of the present application. Therefore, the protection scope of the present application shall be subject to the protection scope of the appended claims.

What is claimed is:

1. A storage controller system updating method, comprising:
    performing a system updating operation on a storage controller, and obtaining a real-time speed value and a real-time operation volume value that are generated in response to the system updating operation being performed on the storage controller;
    obtaining a speed reference value and an operation volume reference value from a database based on device information of the storage controller;
    determining a volume corresponding to an operation volume abnormity based on a relationship between the real-time speed value and the speed reference value and a relationship between the real-time operation volume value and the operation volume reference value, and adjusting a volume parameter; and
    continuing to perform the system updating operation based on an adjusted volume parameter.

2. The storage controller system updating method according to claim 1, wherein the obtaining the speed reference value and the operation volume reference value from the database based on the device information of the storage controller comprises:
    obtaining the device information of the storage controller; and
    in response to the device information of the storage controller being present in the database, obtaining the speed reference value and the operation volume reference value that correspond to the storage controller from the database.

3. The storage controller system updating method according to claim 1, wherein the obtaining the speed reference value and the operation volume reference value from the database based on the device information of the storage controller comprises:
    in response to the device information of the storage controller being not present in the database, determining the speed reference value and the operation volume reference value that are for the storage controller based on a speed reference value and an operation volume reference value that are stored in the database.

4. The storage controller system updating method according to claim 3, wherein the determining the speed reference value and the operation volume reference value that are for the storage controller based on the speed reference value and the operation volume reference value that are stored in the database comprises:
    calculating an average value of speed reference values for all storage controllers and an average value of operation volume reference values for all the storage controllers in the database; and
    using the average value of the speed reference values and the average value of the operation volume reference values, which are obtained by calculation, as the speed reference value and the operation volume reference value that are for the storage controller.

5. The storage controller system updating method according to claim 1, wherein the determining the volume corresponding to the operation volume abnormity based on the relationship between the real-time speed value and the speed reference value and the relationship between the real-time operation volume value and the operation volume reference value comprises:
    determining the volume corresponding to the operation volume abnormity based on the relationship between the real-time speed value and the speed reference value and a relationship between the real-time operation volume value and a threshold of the operation volume reference value.

6. The storage controller system updating method according to claim 5, wherein the method further comprises:
    predefining a value around the operation volume reference value as a threshold of the operation volume reference value.

7. The storage controller system updating method according to claim 5, wherein the determining the volume corresponding to the operation volume abnormity based on the relationship between the real-time speed value and the speed reference value and the relationship between the real-time operation volume value and the threshold of the operation volume reference value comprises:
    continuing to perform system updating on the storage controller in response to the real-time speed value of the storage controller being not less than the speed reference value.

8. The storage controller system updating method according to claim 7, wherein the determining the volume corresponding to the operation volume abnormity based on the relationship between the real-time speed value and the speed reference value and the relationship between the real-time operation volume value and the threshold of the operation volume reference value comprises:
    in response to the real-time speed value of the storage controller being less than the speed reference value, further comparing the real-time operation volume value and the operation volume reference value, to determine the volume corresponding to the operation volume abnormity.

9. The storage controller system updating method according to claim 8, wherein the comparing the real-time operation volume value and the operation volume reference value, to determine the volume corresponding to the operation volume abnormity comprises:
    obtaining a real-time operation volume value of each volume corresponding to the storage controller; and continuing to perform system updating on the storage controller in response to the real-time operation volume value of each volume corresponding to the storage controller being less than a threshold of the operation volume reference value.

10. The storage controller system updating method according to claim 9, wherein the comparing the real-time operation volume value and the operation volume reference value, to determine the volume corresponding to the operation volume abnormity comprises:
in response to the real-time operation volume value of each volume corresponding to the storage controller being not less than the threshold of the operation volume reference value, determining a volume corresponding to a real-time operation volume value exceeding the threshold of the operation volume reference value as the volume corresponding to the operation volume abnormity.

11. The storage controller system updating method according to claim 1, wherein the adjusting the volume parameter comprises:
modifying a quality of service (QOS) value of the volume, to limit an input/output operations per second (IOPS) value to reduce an operation volume.

12. The storage controller system updating method according to claim 1, wherein the obtaining the real-time speed value generated in response to the system updating operation being performed on the storage controller comprises:
representing the real-time speed value by using time taken from a failure in attempting to connect the storage controller to a succeed in attempting to connect the storage controller.

13. The storage controller system updating method according to claim 4, wherein after the using the average value of the speed reference values and the average value of the operation volume reference values, which are obtained by calculation, as the speed reference value and the operation volume reference value that are for the storage controller, the method further comprises:
storing the average value of the speed reference values and the average value of the operation volume reference values, which are obtained by calculation, in the database associatively with corresponding storage controller device information.

14. The storage controller system updating method according to claim 13, wherein newly stored storage controller device information is indexed during the average value of the speed reference values and the average value of the operation volume reference values, which are obtained by calculation, are stored in the database associatively with the corresponding storage controller device information; and the method further comprises:
querying index information regularly, and sending storage controller device information corresponding to the found index information to operation and maintenance personnel, to prompt the operation and maintenance personnel to update the speed reference value and the operation volume reference value; and
receiving and updating, to the database, an updated speed reference value and operation volume reference value obtained by the operation and maintenance personnel.

15. The storage controller system updating method according to claim 14, wherein updating the speed reference value and the operation volume reference value comprises:

determining a matched speed reference value and operation volume reference value based on a model number, an operation scenario, and a configuration of the storage controller; and
storing the speed reference value and the operation volume reference value that are for the storage controller in the database, wherein
the device information of the storage controller comprises the model number, the operation scenario, and the configuration; and
the database comprises a first database and a second database, the first database stores the speed reference value, and the second database stores the operation volume reference value.

16. The storage controller system updating method according to claim 15, wherein one storage controller model number, one operation scenario, and one configuration correspond to one speed reference value and one operation volume reference value.

17. The storage controller system updating method according to claim 1, wherein after the continuing to perform the system updating operation based on the adjusted volume parameter, the method further comprises:
continuing to obtain a real-time speed value and a real-time operation volume value in real time, to adjust the volume parameter in real time to ensure normal system updating of the storage controller.

18. A computer device, comprising:
a memory storing computer-readable instructions; an
one or more processors configure to execute the computer-readable instructions, wherein upon execution of the computer-readable instructions, the one or more processors is configured to:
perform a system updating operation on a storage controller, and obtain a real-time speed value and a real-time operation volume value that are generated in response to the system updating operation being performed on the storage controller;
obtain a speed reference value and an operation volume reference value from a database based on device information of the storage controller;
determine a volume corresponding to an operation volume abnormity based on a relationship between the real-time speed value and the speed reference value and a relationship between the real-time operation volume value and the operation volume reference value, and adjust a volume parameter; and
continue to perform the system updating operation based on an adjusted volume parameter.

19. One or more non-volatile computer-readable storage media, storing computer-readable instructions, wherein the computer-readable instructions, upon execution by one or more processors, are configured to cause the one or more processors to:
perform a system updating operation on a storage controller, and obtain a real-time speed value and a real-time operation volume value that are generated in response to the system updating operation being performed on the storage controller;
obtain a speed reference value and an operation volume reference value from a database based on device information of the storage controller;
determine a volume corresponding to an operation volume abnormity based on a relationship between the real-time speed value and the speed reference value and a relationship between the real-time operation volume value and the operation volume reference value, and adjust a volume parameter; and continue to perform the system updating operation based on an adjusted volume parameter.

20. The storage controller system updating method according to claim 5, wherein the threshold of the operation volume reference value is 80% of the operation volume reference value.

* * * * *